United States Patent [19]
Henshaw

[11] Patent Number: 5,775,256
[45] Date of Patent: Jul. 7, 1998

[54] BIRD FEED RECYCLER

[76] Inventor: Thomas A. Henshaw, 1667 Carriage Dr. West, Titusville, Fla. 32796

[21] Appl. No.: 767,546

[22] Filed: Dec. 16, 1996

Related U.S. Application Data

[63] Continuation-in-part of Ser. No. 679,825, Jul. 15, 1996, Pat. No. 5,711,247.

[51] Int. Cl.$^6$ .................................................. A01K 39/01
[52] U.S. Cl. ...................................... 119/57.8; 119/166
[58] Field of Search ............................... 119/57.8, 57.9, 119/52.2, 52.3, 165, 166, 51.03

[56] References Cited

U.S. PATENT DOCUMENTS

| | | |
|---|---|---|
| 429,196 | 6/1890 | Leonard . |
| 2,786,446 | 3/1957 | Newman . |
| 2,963,003 | 2/1960 | Oberg et al. ............... 119/166 |
| 2,971,493 | 2/1961 | Robb ........................... 119/166 |
| 3,083,687 | 4/1963 | Slaven ..................... 119/57.8 X |
| 4,765,277 | 8/1988 | Bailey et al. ................ 119/57.9 |
| 5,355,835 | 10/1994 | Freed ........................ 119/57.9 |
| 5,392,732 | 2/1995 | Fry ............................ 119/57.9 |

*Primary Examiner*—Michael J. Carone
*Assistant Examiner*—Yvonne R. Abbott
*Attorney, Agent, or Firm*—Edward M. Livingston, Esq.

[57] ABSTRACT

A bird-feed recycler having a base frame (1) with a screen (2) and a pole attachment (6) for a bird-feeder pole (4). The base frame is sized, shaped and structured for positioning either under a bird feeder (3) at a base of a pole, on a pole at a desired height or under a bird feeder suspended from an object such as a limb (11) of a tree or part of a structure (10). A bird-feeder perch (12) can be positioned at a design distance from a bird-feeder trough (13) to catch feces of birds eating from the bird-feeder trough. One embodiment of the bird feeder can also be used by itself without a traditional bird feeder by placing it on a ground surface and putting seed on the screen or by mounting it at an adjustable height on a pole above the ground surface.

8 Claims, 4 Drawing Sheets

U.S. Patent    Jul. 7, 1998    Sheet 1 of 4    5,775,256
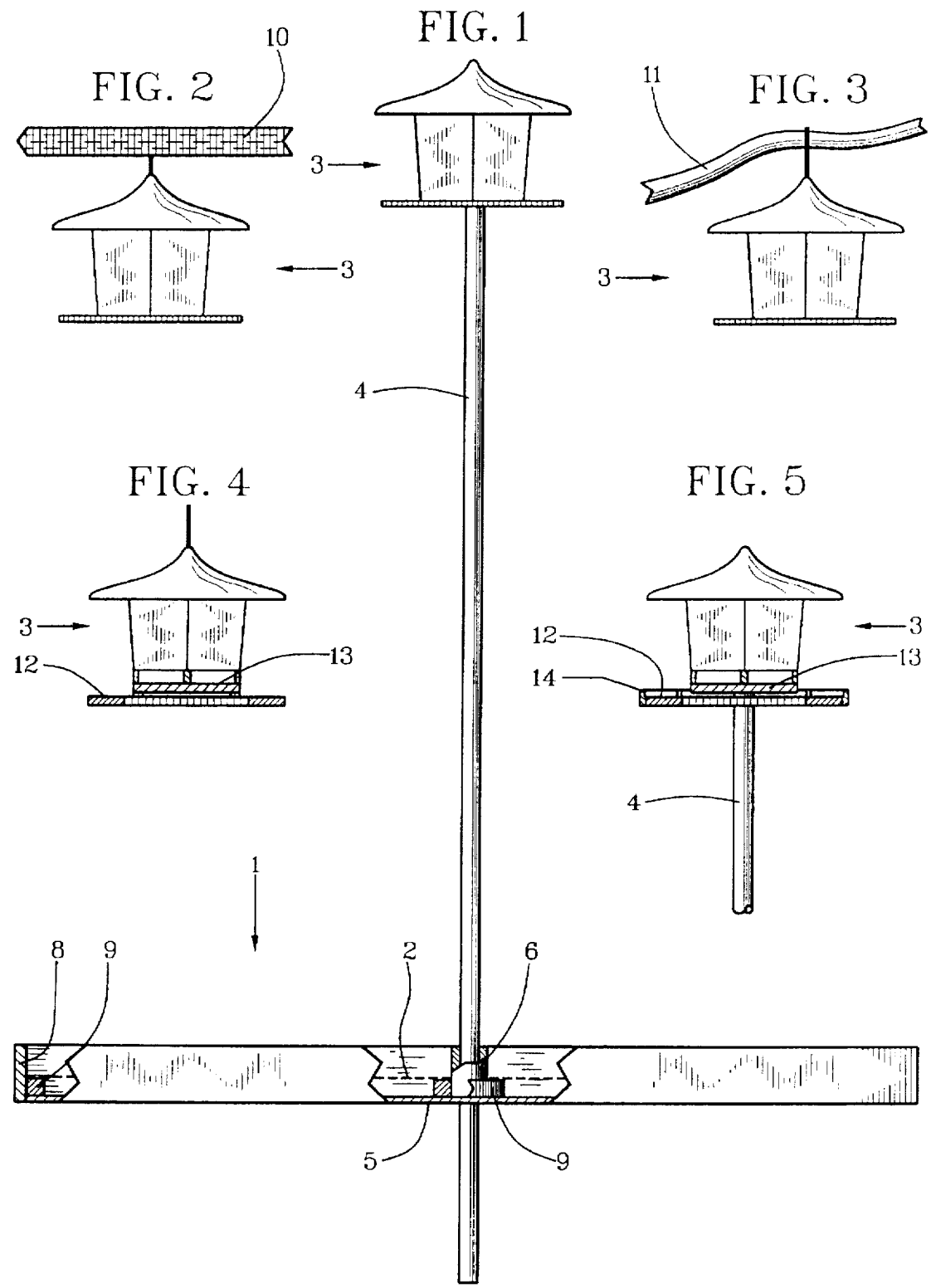

BIRD FEED RECYCLER

This application is a continuation-in-part application to Ser. No. 08/679,825, filed Jul. 15, 1996.

BACKGROUND OF THE INVENTION

Conventional bird feeders and bird houses for wild birds typically are positioned on a pole or suspended from a structure or a plant such as a tree limb. It has been found, however, that birds throw out and waste about two thirds of their feed by scattering it as they eat it. Typically, the bird seed is wasted on surfaces that it falls onto. There it clutters areas where people feed wild birds to attract them for their natural beauty. The area must be cleaned if it is a flat surface such as cement or wood. If it is ground or garden, however, the wasted seed sprouts and grows into a mixture of unwanted plants and weeds. In any environment, the wasted bird seed creates various forms of unwanted nuisance. With this invention, however, disposing of wasted seed or ridding a garden of bird-seed weeds are prices that need not be paid for the company of wild birds.

There is no known catcher of bird seed that can be used with the most desirable and attractive bird feeders and bird houses. Some bird feeders have provisions for catching and some for reusing wasted bird seed. However, they are not attractive to most wild birds and, therefore, defeat the purpose of bird feeding. Examples of different but related art is described in the following patent documents. U.S. Pat. No. 4,940,019, issued to Coffer on Jul. 10, 1990, described a bird feeder having a cascaded series of feed catchers and recycling feeders that was mechanically effective but not attractive to either birds desired to be attracted or to bird-watcher individuals. It could not be used with other types of more attractive and more effective bird feeders. U.S. Pat. No. 2,786,446, issued to Newman on Mar. 26, 1957, taught a bird feeder with a relatively large platform that was not adequate for collecting wasted seed or for recycling it. Further, it hid birds from view of bird watchers who were not at a sufficiently high position for viewing across the platform. U.S. Pat. No. 2,715, 386, issued to Jones on Aug. 16, 1955, taught a bird feed and water station having conical feed and water containers without provision for catching and recycling wasted bird feed.

SUMMARY OF THE INVENTION

In light of need for catchers and recyclers of bird feed wasted at bird feeders, objects of this invention are to provide a bird feeder-seed recyler Can be used with any type of bird feeder;

Can be used with bird feeders that are attractive to particular types of birds and to different mixes of bird types;

Can be used wherever bird feeders are positioned;

Can also be used as a bird feeder by itself;

Prevents waste and litter of wasted bird seed;

Prevents growth of weeds and undesired plants from wasted bird seed; and

Facilitates recycling of wasted bird seed.

This invention accomplishes these and other objectives with a bird-feed recycler having a base frame with a screen and a pole attachment for a bird-feeder pole. The base frame is sized, shaped and structured for positioning either under a bird feeder at a base of a pole, on a pole at a desired height or under a bird feeder suspended from an object such as a limb of a tree or part of a structure. A birdfeeder perch can be positioned at a design distance from a bird-feeder trough to catch feces of birds eating from the bird-feeder trough. Other embodiments of the invention can be used as a ground bird feeder and be made height adjustable by mounting it to a pole.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 1 is a partially cutaway elevation view of a bird-feed recycler below a bird feeder at a desired position on a bird-feeder pole;

FIG. 2 is a side view of a bird feeder suspended from a structure below which a bird-feed recycler can be positioned;

FIG. 3 is a side view of a bird feeder suspended from a limb of a tree below which a bird-feed recycler can be positioned;

FIG. 4 is a side view of a bird feeder having a bird perch that is attachable to a bird feeder and positioned a design distance externally from an outside periphery of a bird-feeder trough to allow bird feed to pass between the bird-feeder trough and the bird perch and to prevent feces of feeding birds from dropping onto the bird-feed recycler;

FIG. 5 is the FIG. 4 embodiment attached to a bird-feeder pole and having retainer walls at outside edges;

DESCRIPTION OF THE PREFERRED EMBODIMENT

Figure 7:
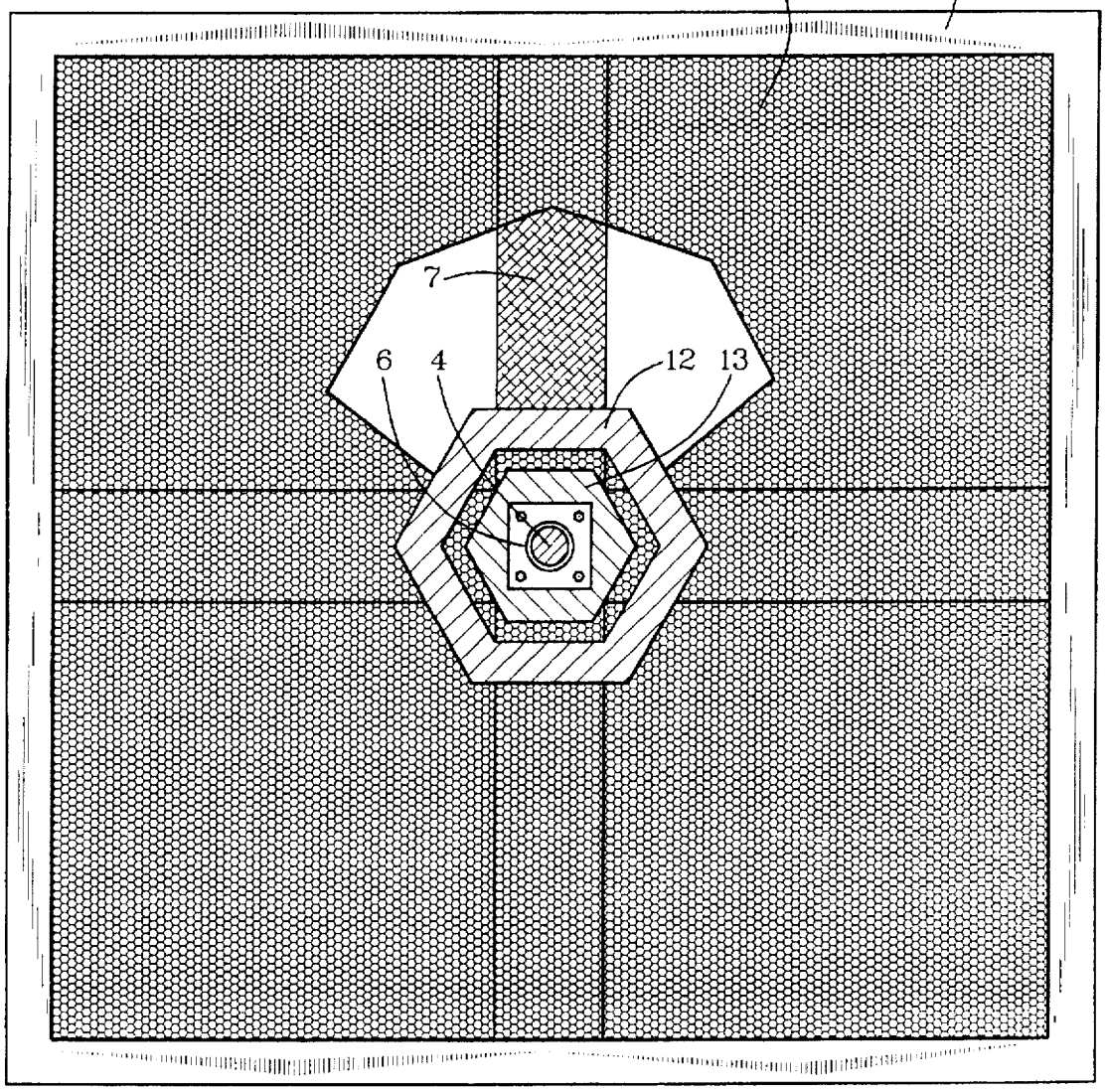
FIG. 7 is a partially cutaway top view of a bird-feed recycler.

Reference is made first to FIG. 1. A base frame 1 having a screen 2 is positioned vertically below a bird feeder 3 that is positioned on a bird-feeder pole 4 to which the base frame 1 is attached at ground level or at a desired height on the bird-feeder pole 4. The base frame 1 has a bottom 5 to which a pole attachment 6 is attached. The bottom 5 can be a panel bottom as depicted in FIG. 1 or cross members 7 as shown in FIG. 7. A container wall 8 can be provided on an outside perimeter of the base frame 1. The screen 2 can be raised above the bottom 5 or the cross members 7 and positioned on the container walls 8 or on screen blocks 9 as illustrated.

The base frame 1 can be sized, shaped and structured for use in a variety of locations. It can be round, rectangular or have a desired plurality of sides. It can have girders, a panel, cross members or other structural members to which container walls 8 can be attached.

The bird feeder 3 and the bird-feeder pole 4 can be conventional items with which this bird-feed recycler is used. A bottom of the bird-feeder pole 4 can be positioned in the pole attachment 6 for use of the base frame 1 as a base for the bird-feeder pole 4. Optionally, the bottom of the bird-feeder pole 4 can be embedded in ground, in cement or attached to other base structure, such that the base frame 1 can be positioned on the bird-feeder pole 4 at a desired height above a ground level or other base level.

Referring to FIGS. 2–3, a base frame 1 described in relation to FIG. 1 can be positioned vertically below a bird feeder 3 that is attached to part of a structure 10 as shown in FIG. 2 or attached to a limb 11 of a tree as depicted in FIG. 3, such that the bird-feeder pole 4 described in relation to FIG. 1 is not necessary.

Referring to FIGS. 4–5, a bird perch 12 can be provided for a bird feeder 3 to prevent feces of feeding birds from dropping on the screen 2 that is intended for catching bird feed for being recycled. Unlike conventional bird perches, the bird perch 12 is sized, shaped and structured to be positioned a design distance externally from an outside periphery of a bird-feeder trough 13 below which is positioned the base frame 1. The design distance externally from the outside periphery of the bird feeder is proximate a length of necks of a desired class of birds intended to be fed from the bird-feeder trough 13. The bird perch 12 has a width designedly greater than body lengths of the desired class of birds, such that birds perched on the bird perch 12 can eat from bird-feeder trough 13 and spill bird feed between the bird-feeder trough 13 and the bird perch 12 while defecating on the bird perch 12. This prevents bird feces from mixing with bird feed that is saved on the screen 2 of the bird-feed recycler.

The bird-feeder trough 13 can have an opening to allow entry of a desired range of sizes of birds to correspond to body length of birds that can defecate on the bird perch 12 while eating from the bird-feeder trough 13. Different bird feeders 3 with different sizes of openings in the bird-feeder troughs 13 can be provided with bird perches 12 having different widths for different sizes of birds.

The bird perch 12 can be attached directly to the bird feeder 2 as shown in FIG. 4 or attached to the bird-feeder pole 4 as shown in FIG. 5. Also as shown in FIG. 5, a bird perch 12 can have walls 14 to prevent a design level of accumulated bird feces from falling off of the bird perch 12 between cleanings.

Figure 6:
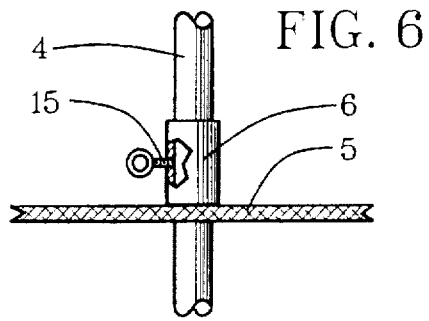
FIG. 6 is a fragmentary and partially cutaway side view of a pole attachment with which a bird-feed recycler is attachable to a bird-feeder pole at ground level or at a desired height on the bird-feeder pole.

Referring to FIG. 6, pole attachment 6 can have a fastener 15 with which the base frame 1 can be fastened to a bird-feeder pole 4 at a desired height. A wide selection of fasteners 15 are foreseeable. A simple set screw depicted is only intended to be representative of fasteners as such. Types of fasteners 15 employed can be selected as appropriate for different types of bird-feeder poles 4 and for different sizes and shapes of base frames 1.

FIG. 7 illustrates a screen 2 vertically above cross members 7 that are employed as a bottom of a base frame 1 to which a pole attachment 6 is attached to hold a bird-feeder pole 4. Depicted also is a bird perch 12 at a design distance from an outside periphery of a bottom of a bird-feeder trough 13 to allow bird feed to fall to the screen 2 between the bird perch 12 and the bird-feeder trough 13 while the bird perch 12 catches bird feces of feeding birds.

Figure 8:
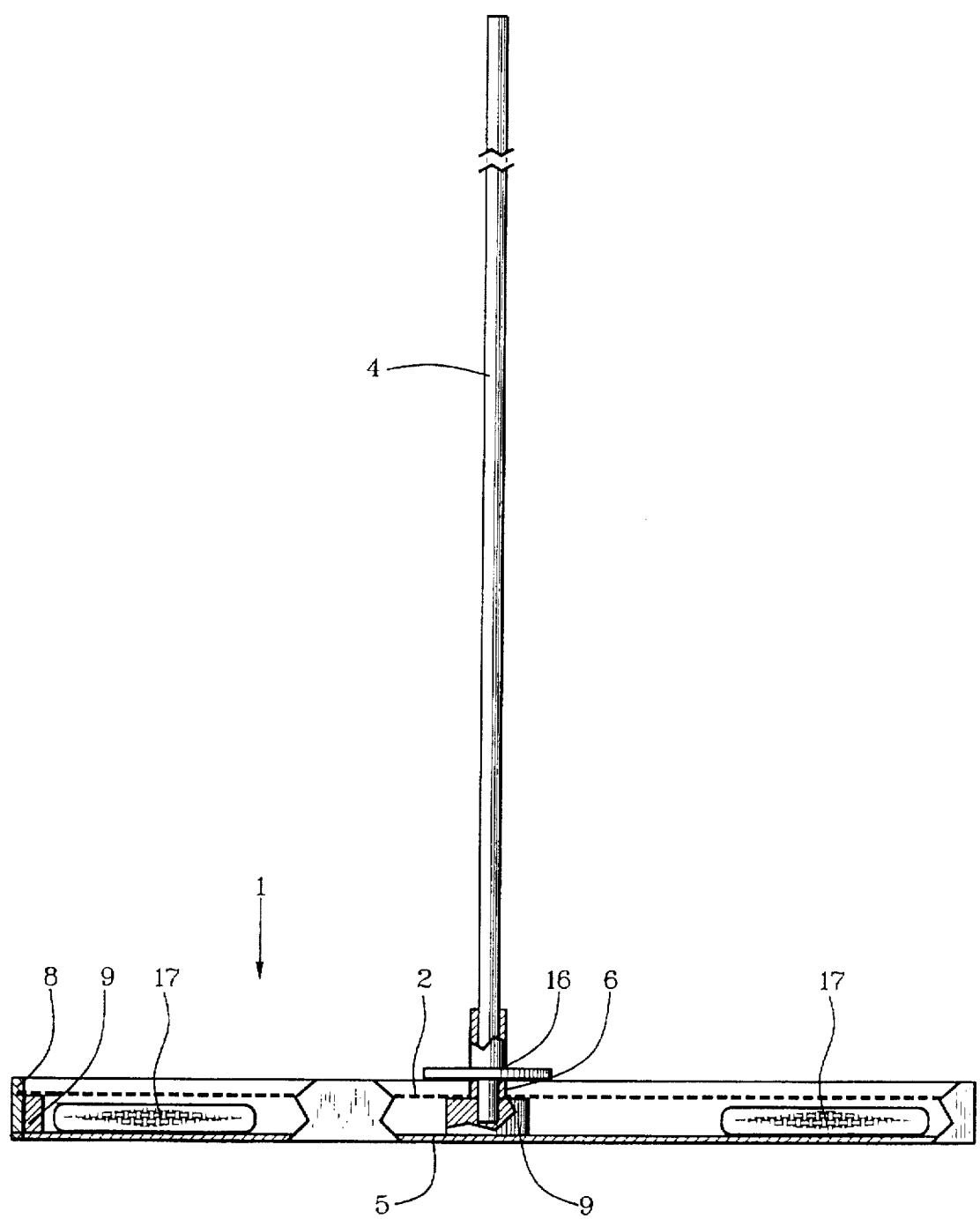
FIG. 8 is a partially cutaway elevation view of a hard-surface base frame with sand bags on it to prevent tipping in opposite to wind and accidental impact on a bird-feeder pole.

Referring to FIG. 8, an embodiment of this invention primarily for use on wood, cement and other hard surfaces is also useable on ground and other yard surfaces. It has a support guide 16 in a center of a base frame 1 and a pole attachment 6 that can either hold a bird-feeder pole 4 above a bottom 5 or allow the bird-feeder pole 4 to pass through the bottom 5. The basic intent of this embodiment being to support a bird-feeder pole 4 above a use-area surface, however, a pole attachment 6 having a blind bottom is depicted. The support guide 16 and the pole attachment 6 can be constructed to assure vertical stability according to design and market preferences.

Because this embodiment rests on a hard surface, it can not rely on embodiment in ground or cement to prevent the bird-feeder pole 4 from tipping. Instead, vertical stability in opposition to wind depends on lateral weight of the base frame 1 or items position on the base frame 1. For relatively light base frames 1 that are easy to move around when desired and that are relatively inexpensive and possibly smaller, sand bags 17 or other weights can be positioned on a bottom 5, on a cross member described in relation to FIG. 7 or on other structural components of the base frame 1. This prevents them from tipping when impacted accidently or when high winds are encountered.

Figure 9:
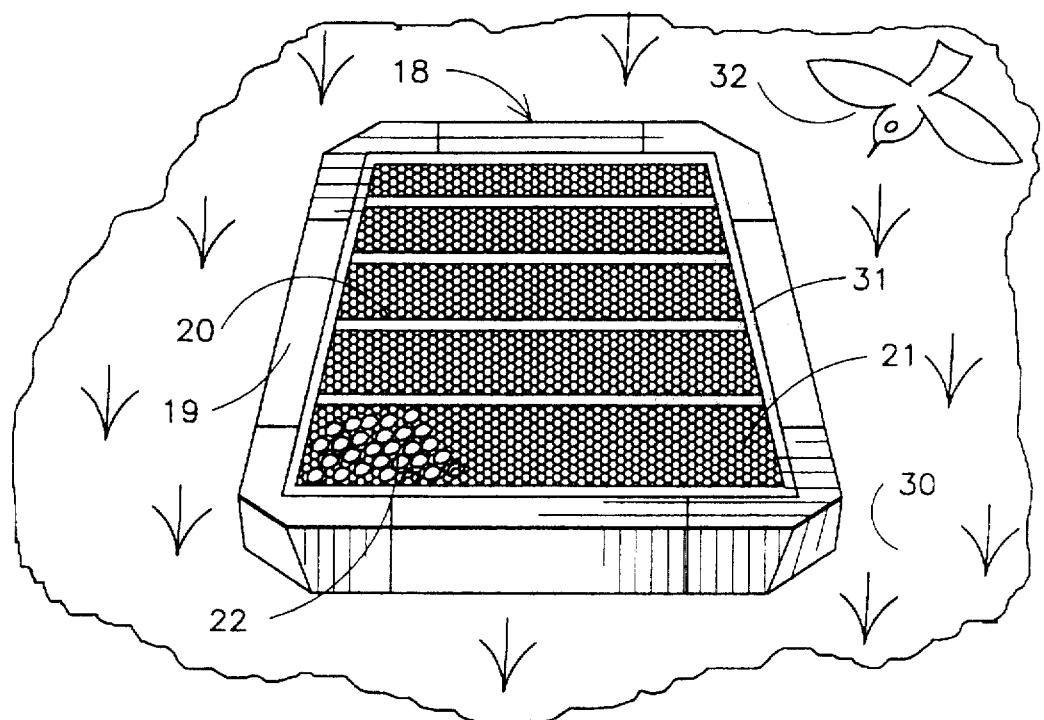
FIG. 9 is a perspective view of another embodiment of the bird feeder and seed saver serving as a ground level bottom feeder.

Absence of a bird feeder 3 on the bird-feeder pole 4 is intended to convey adaptability to whatever bird feeder 3 is positioned on the bird-feeder pole 4. In FIG. 9 a ground level bottom bird feeder 18 is shown having a base frame 19 with screen mesh 21 contained within the boundary of the base frame 19. The screen mesh 21 may be further supported and strengthened to hold birds by cross members 20 and peripheral board members 31. In fact, the screen mesh section itself could be removable from the base frame 19 for easy cleaning. This bottom bird feeder 18 may be placed on any ground or surface 30 and does not necessarily have to be placed under a top hanging feeder. In fact, this particular embodiment may be used as a bird feeder and saver by itself and is not required to be mounted on a feeder pole as some of the other embodiments. Bird seed and feed 22 can be placed directly on the screen mesh 21 and birds 32 can alight on the bird feeder and feed as desired.

Figure 10:
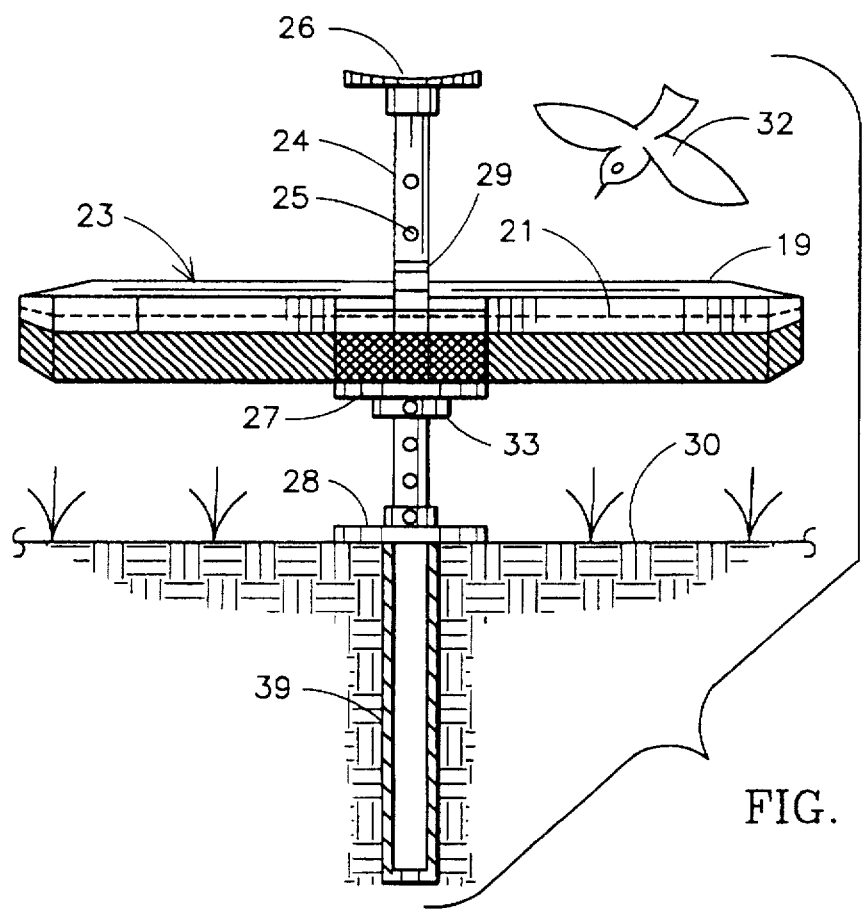
FIG. 10 is a side plan view of a bird feeder which is adjustable in height on a pole.

In FIG. 10 an adjustable height version of a bird feeder 23 is mounted on a pole 24 at a desired height above the ground surface 30. The version illustrated in this FIG. 10 is similar to that shown in FIG. 9 with the exception that it has a hole 29 through a central support 27. The bird feeder 22 is made adjustable on the pole 24 by means of adjustment holes 25 in which pins can be placed through holes in pole support collar 33 to hold the bird feeder in place. The pole 24 is mounted in the ground surface 30 by means of a support guide 28 which may extend around the pole on the surface 30 and into the ground support sleeve 34. A decorative top cap 26 may be added to the top of the pole 24. This adjustable bottom feeder may be placed at any height along the length of the pole 24 to impede ground animals, such as cats, which may prey on unsuspecting birds eating from the feeder.

A new and useful bird-feed recycler having been described, all such modifications, adaptations, substitutions of equivalents, mathematical possibilities of combinations of parts, pluralities of parts, applications and forms thereof as described by the following claims are included in this invention.

What is claim is:

1. A bird feeder and seed saver comprising:
   a base frame sized, shaped and structured for positioning on a generally planar surface; and
   a screen mesh insert on the base frame, the screen mesh insert being sized, shaped and structured to hold bird feed; and wherein the screen mesh has built-in cross support members and a peripheral border.

2. The bird feeder and saver in claim 1 wherein the screen mesh insert is mounted between peripheral board members of the laseframe so that it lies within a recess in the base frame and can be removed as desired for cleaning and other purposes.

3. A bird feeder and saver comprising:

a base frame sized, shaped and structured for positioning on a pole at a desired height above a ground surface and a predetermined distance from the bird feeder;

a screen mesh insert on the base frame, the screen being sized, shaped and structured to contain bird feed; and a pole attachment on the base frame, the pole attachment being sized, shaped and structured for attachment to a bird feeder pole.

4. The bird feeder and saver in claim 3 wherein the pole attachment is positioned approximately center of the base frame.

5. The bird feeder and saver in claim 4 wherein the pole attachment is a sleeve that is sized and shaped to receive a bird feeder pole snugly.

6. The bird feeder and saver in claim 5 wherein the pole attachment has a fastener with which the pole attachment can be fastened onto the bird feeder pole at a desired height above a surface.

7. The bird feeder and saver in claim 3 which further contains a cap mounted on the top of the pole at a desired height above the base frame of the bird feeder.

8. The bird feeder and saver in claim 3 wherein the base frame is adjustable along the pole by means of a support collar containing a hole through which a pin may be placed to extend through the collar and into holes at spaced intervals in the pole.

* * * * *